United States Patent
Ishihara

(10) Patent No.: US 10,270,977 B2
(45) Date of Patent: Apr. 23, 2019

(54) IMAGING APPARATUS AND A METHOD OF TRACKING A SUBJECT IN THE IMAGING APPARATUS

(71) Applicant: CASIO COMPUTER CO., LTD., Shibuya-shi, Tokyo (JP)

(72) Inventor: Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 335 days.

(21) Appl. No.: 14/559,562

(22) Filed: Dec. 3, 2014

(65) Prior Publication Data
US 2015/0262379 A1    Sep. 17, 2015

(30) Foreign Application Priority Data

Mar. 13, 2014    (JP) .................................. 2014-050702

(51) Int. Cl.
*H04N 5/235*    (2006.01)
*H04N 5/232*    (2006.01)
(Continued)

(52) U.S. Cl.
CPC ....... *H04N 5/23296* (2013.01); *G01S 3/7864* (2013.01); *G02B 7/10* (2013.01);
(Continued)

(58) Field of Classification Search
CPC ..................................................... H04N 5/232
(Continued)

(56) References Cited

U.S. PATENT DOCUMENTS

| 6,002,431 A * | 12/1999 | Jung | ........................ G06T 5/20 348/155 |
| 8,175,405 B1 * | 5/2012 | Pathak | ................... G06T 5/002 382/254 |

(Continued)

FOREIGN PATENT DOCUMENTS

| JP | 2005086591 A | 3/2005 |
| JP | 2010267072 A | 11/2010 |

(Continued)

OTHER PUBLICATIONS

Japanese Office Action (and English translation thereof) dated Mar. 1, 2016, issued in counterpart Japanese Application No. 2014-050702.

*Primary Examiner* — Jonathan R Messmore
(74) *Attorney, Agent, or Firm* — Holtz, Holtz & Volek PC

(57) ABSTRACT

An imaging apparatus for tracking a subject is provided. The An imaging apparatus has an imaging unit which images a subject to obtain an image, an area detecting unit which detects in the image obtained by the imaging unit a light changing area, in which light changes in a time-series manner, a position detecting unit which detects a position of the light changing area detected by the area detecting unit in the image obtained by the imaging unit, a local area searching unit which searches for a local area within a prescribed region defined on the basis of the position of the light changing area detected by the position detecting unit, wherein the local area shows a large feature value in an image processing, and a tracking unit which tracks movement of the local area found by the local area searching unit.

12 Claims, 3 Drawing Sheets

(51) Int. Cl.
*G01S 3/786* (2006.01)
*G02B 7/10* (2006.01)
*G06T 7/246* (2017.01)

(52) U.S. Cl.
CPC ............. *G06T 7/246* (2017.01); *H04N 5/232* (2013.01); *G06T 2207/30204* (2013.01)

(58) Field of Classification Search
USPC .......................................................... 348/39
See application file for complete search history.

(56) References Cited

U.S. PATENT DOCUMENTS

| 2005/0035313 | A1* | 2/2005 | Garssen | G01V 8/10 250/559.33 |
| 2005/0071733 | A1* | 3/2005 | Fukae | G06F 13/426 714/776 |
| 2006/0239675 | A1* | 10/2006 | Iizuka | H04B 10/1125 396/287 |
| 2010/0030545 | A1* | 2/2010 | Uno | G03F 1/36 703/13 |
| 2010/0033571 | A1* | 2/2010 | Fujita | B60W 40/02 348/149 |
| 2011/0007942 | A1* | 1/2011 | Audet | G01S 17/66 382/103 |
| 2013/0215319 | A1* | 8/2013 | Tomita | G02B 7/28 348/345 |
| 2013/0286413 | A1* | 10/2013 | Iwafuchi | H04N 1/6061 358/1.9 |

FOREIGN PATENT DOCUMENTS

| JP | 2011166318 A | 8/2011 |
| JP | 2013081145 A | 5/2013 |

* cited by examiner

IMAGING APPARATUS AND A METHOD OF TRACKING A SUBJECT IN THE IMAGING APPARATUS

CROSS-REFERENCE TO RELATED APPLICATION

The present application is based upon and claims the benefit of priority from the prior Japanese Patent Application No. 2014-050702, filed Mar. 13, 2014, the entire contents of which are incorporated herein by reference.

BACKGROUND OF THE INVENTION

1. Field of the Invention

The present invention relates to an imaging apparatus using technology of visible light communication and a method of tracking a subject in the imaging apparatus.

2. Description of the Related Art

Various technologies have been proposed, of recognizing while watching transmitted information while watching an object which includes a light emitting unit transmitting information in a visible light communication. For instance, Japanese Unexamined Patent Publication No. 2010-267072 has disclosed one of the technologies.

Including the technology disclosed in Japanese Unexamined Patent Publication No. 2010-267072, when tracking a subject to be photographed with a camera, which subject includes the light emitting unit using the visible light communication, in general a process is performed in accordance with algorithm of tracking the subject while maintaining the light emitting unit at the center of the image to be photographed with the camera.

SUMMARY OF THE INVENTION

According to one aspect of the invention, there is provided an imaging apparatus which comprises an imaging unit which images a subject to obtain an image, an area detecting unit which detects in the image obtained by the imaging unit a light changing area, in which light changes in a time-series manner, a position detecting unit which detects a position of the light changing area detected by the area detecting unit in the image obtained by the imaging unit, a local area searching unit which searches for a local area within a prescribed region defined on the basis of the position of the light changing area detected by the position detecting unit, wherein the local area shows a large feature value in an image processing, and a tracking unit which tracks movement of the local area found by the local area searching unit.

BRIEF DESCRIPTION OF THE DRAWINGS

FIG. 3 is a view showing an example of an area set in an image, where an optical tag is included and the character value is searched for.

DETAILED DESCRIPTION OF THE PREFERRED EMBODIMENTS

Now, a digital camera having a function of tracking an optical tag in an image to be photographed, according to the preferred embodiments of the invention will be described with reference to the accompanying drawings in detail.

Figure 1:
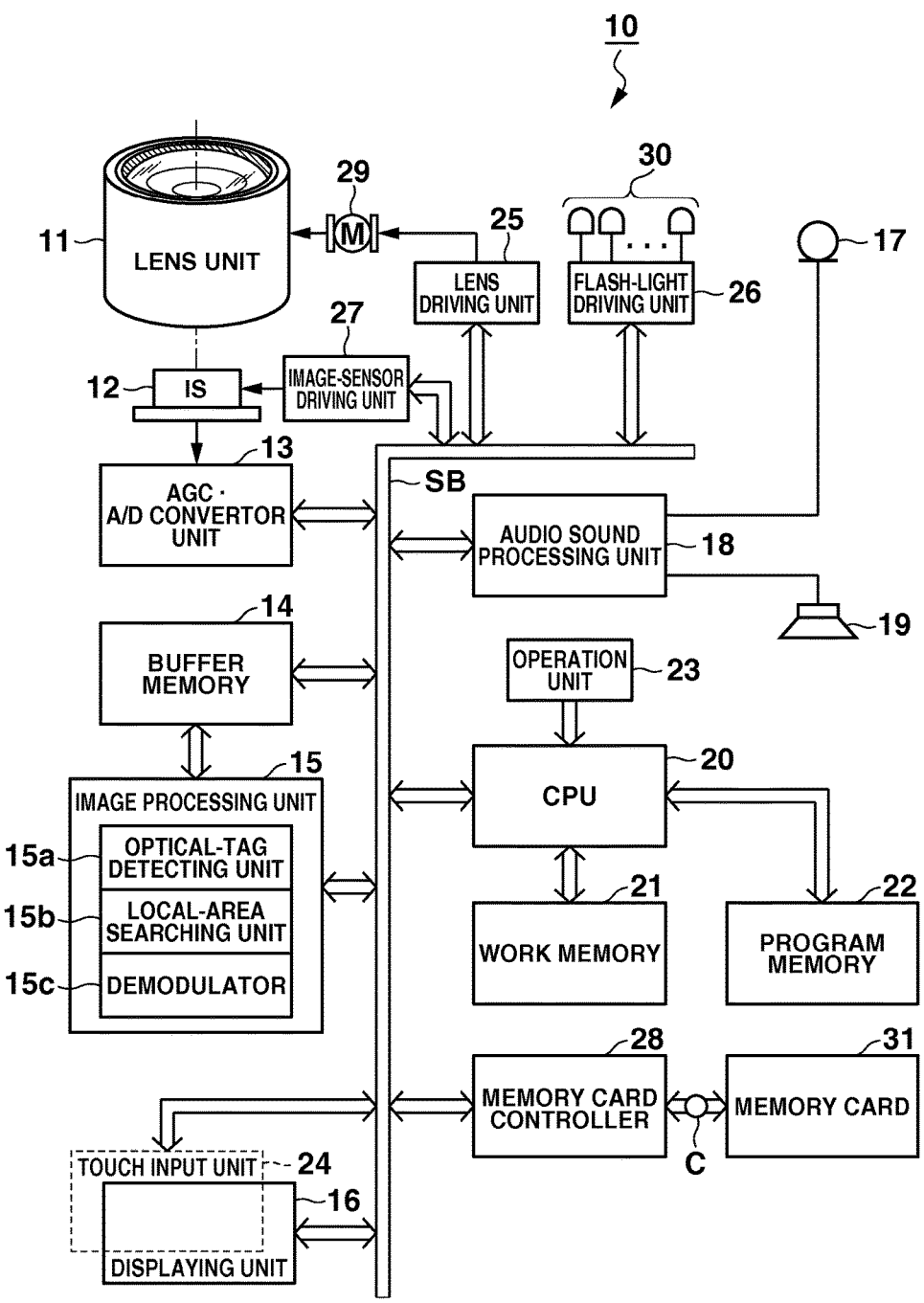
FIG. 1 is a block diagram of a circuit configuration of a digital camera according to the embodiment of the invention.

FIG. 1 is a block diagram of a circuit configuration of the digital camera 10 according to the embodiment of the invention. The digital camera 10 receives an optical image of a subject through a lens unit 11 provided at the front of its camera housing and forms an image of the subject on an imaging surface of a solid-state imaging device or Image Sensor (IS) 12 such as CCD (Charge Coupled Device) and CMOS image sensors.

In a monitor mode in which a through image or a live image of the subject is displayed, the subject is imaged by the solid-state imaging device 12 to obtain an image signal. The image signal is sent to AGC·A/D converter unit 13. In the AGC·A/D converter unit 13, the image signal is subjected to a correlative square sampling process and an automatic gain controlling process and converted into a digital signal. The digital signal (image data) is sent to and stored in a buffer memory 14 through a system bus SB.

Further, the image data stored in the buffer memory 14 is subjected to an imaging process in an image processing unit 15 as required. The image processing unit 15 comprises an optical-tag detecting unit 15a, a local-area searching unit 15b, and a demodulator 15c.

It is possible to constitute these optical-tag detecting unit 15a, local-area searching unit 15b, and demodulator 15c as hardware circuits and it is also possible to realize these hardware circuits as functions that can be performed by a program in a visible light communication mode, as will described later.

The optical-tag detecting unit 15a detects a position of an optical tag blinking in an image to be photographed, which optical tag blinks in visible light communication.

The local-area searching unit 15b serves to calculate and search for a local area which shows the maximum feature value, from a region including the optical tag.

The demodulator 15c demodulates modulated information generated from the blinking optical tag to obtain the information.

The image processing unit 15 performs a demosaicing process including a matrix operation, a pixel interpolation process, and a gamma correction process, on image data corresponding to Bayer arrangement for color filters provided on the solid-state imaging device 12, thereby developing RAW data (Bayer data) to transform to image data composed of YUV data.

The image processing unit 15 deletes pixels and gradation bits from the image data to produce image data for indication and sends the image data for indication to a displaying unit 16 to display the image data thereon as a through image.

On the front surface of the camera housing, there is provided a micro-phone 17 in addition to the lens unit 11. The micro-phone 17 receives audio sounds coming from the subject and changes the audio sounds to an electric signal, sending the electric signal to an audio sound processing unit 18.

When recording audio sounds separately from others, photographing a still image with audio sounds, and/or photographing a moving image, the audio sound processing unit 18 converts an audio signal entered from the micro-phone 17 into digitized audio data. Further, the audio sound processing unit 18 detects a sound pressure level of the digitized audio data, and compresses the digitized audio data in a prescribed data file format, for example, in AAC (moving picture experts group-4 Advanced Audio Coding) format to create an audio data file, and sends out the audio data file to a recording medium to be described later.

Further, the audio sound processing unit 18 is provided with a sound source circuit such as a PCM sound source, and de-compresses the audio data file received in a playback mode to obtain an analog signal, outputting the analog signal from a speaker 19 provided on the rear surface of the camera housing of the digital camera 10.

CPU 20 controls operation of the whole circuits described above. CPU 20 is connected directly with a work memory 21 and a program memory 22. For instance, the work memory 21 consists of DRAM. The program memory 22 consists of an electrically writable non-volatile memory such as a flash memory. The program memory 22 fixedly stores operation programs including a program for controlling a continuous shooting speed, and data.

CPU 20 reads a necessary program and data from the program memory 22 and temporarily expands them on the work memory 21 to control the whole operation of the digital camera 10.

Further, in response to various key-operation signals entered directly from an operation unit 23 and/or operation signals entered from a touch input unit 24 provided on the displaying unit 16, CPU 20 performs an controlling operation.

The operation unit 23 is provided with, for instance, a power source key, a shutter release key, a zoom up/down key, a shooting mode key, a playback mode key, a menu key, a cursor ("↑" "→" "↓" "←"), a set key, a re-set key, and a display key.

The touch input unit 24 is composed of a transparent conductive film which integrally covers the surface of the displaying unit 16. When a user touches the touch input unit 24 with his/her finger, the touch input unit 24 generates an operation signal representing coordinate information corresponding to the position on the displaying unit 16, touched by the user, and sends the operation signal to CPU 20.

As shown in FIG. 1, CPU 20 is connected with the AGC·A/D converter unit 13, the buffer memory 14, the image processing unit 15, the displaying unit 16, the touch input unit 24, the audio sound processing unit 18, a lens driving unit 25, a flash-light driving unit 26, an image sensor (IS) driving unit 27, and a memory card controller 28 through the system bus SB.

The lens driving unit 25 receives a control signal from CPU 20, and controls rotation of a DC motor (M) 29 for driving the lens unit 11 to move a zoom lens and/or a focus lens along their optical axes, separately. The lens unit 11 has plural lenses including the zoom lens and the focus lens.

When photographing a still image, the flash-light driving unit 26 receives the control signal from CPU 20 and drives plural LEDs of a flash light unit 30 to turn on in synchronization with the photographing operation. The flash light unit 30 comprises plural high luminance LEDs of white color.

The image sensor driving unit 27 scans the solid-state imaging device 12 in accordance with the photographing condition set at the time.

When photographing an image in response to the shutter release operation performed on the operation unit 23, the image processing unit 15 performs the demosaicing process on the image data sent from the AGC·A/D converter unit 13 and stored in the buffer memory 14, and further performs a data compression process on the image data, thereby deleting a large amount of data volume from the image data to create an image-data file. If the image data is in a prescribed data file format, for instance, in JPEG (Joint Photographic Experts Group), the data compression such as DCT (Discrete Cosine Transform) and/or Huffman coding is performed on the image data to create the image-data file. The created image-data file is sent to the memory card 31 through the memory controller 28 and the system bus SB.

Further, in the playback mode, the image processing unit 15 receives image data through the system bus SB, which data is read from the memory card 31 by the memory card controller 28. Further, the image processing unit 15 stores the image data in the buffer memory 14, and then performs an expanding process on the image data stored in the buffer memory 14, de-compressing the image data to obtain data of the original size, and sends the image data of the original size through the system bus SB to the displaying unit 16 to be displayed thereon.

The memory card controller 28 is connected with the memory card 31 through a card connector C. The memory card 31 is detachably installed on the digital camera 10, and used as a recording medium of the digital camera 10 for recording image data. The memory card 31 is provided with non-volatile flash memory which can be electrically rewritable in unit of block and a driving circuit.

Now, operation of the digital camera 10 having the above described configuration will be described.

When performing a process of tracking the optical tag in an image displayed on the displaying unit 16 in the visible light communication mode, CPU 20 reads the operation program and data stored in the program memory 22 and expands them on the work memory 21 to work as follows, or CPU 20 makes the optical-tag detecting unit 15*a*, the local area searching unit 15*b*, and the demodulator 15*c* execute as follows.

In addition to the operation program and others which are stored in the program memory 22 of the digital camera 10 when the digital cameras 10 are shipped from the manufacturing factory, an updated operation program and data are included in the program memory 22, which are down loaded through a connected personal computer, when the digital camera 10 has been version upgraded.

While monitoring an image in the shooting mode including the visible light communication mode, CPU 20 makes the image sensor driving unit 27 scan the solid-state imaging device 12 at a prescribed frame rate, for instance, at 60 frames/sec, and successively stores obtained images in the buffer memory 14 and also successively displays the obtained images on the displaying unit 16 as through images in real time.

Figure 2:
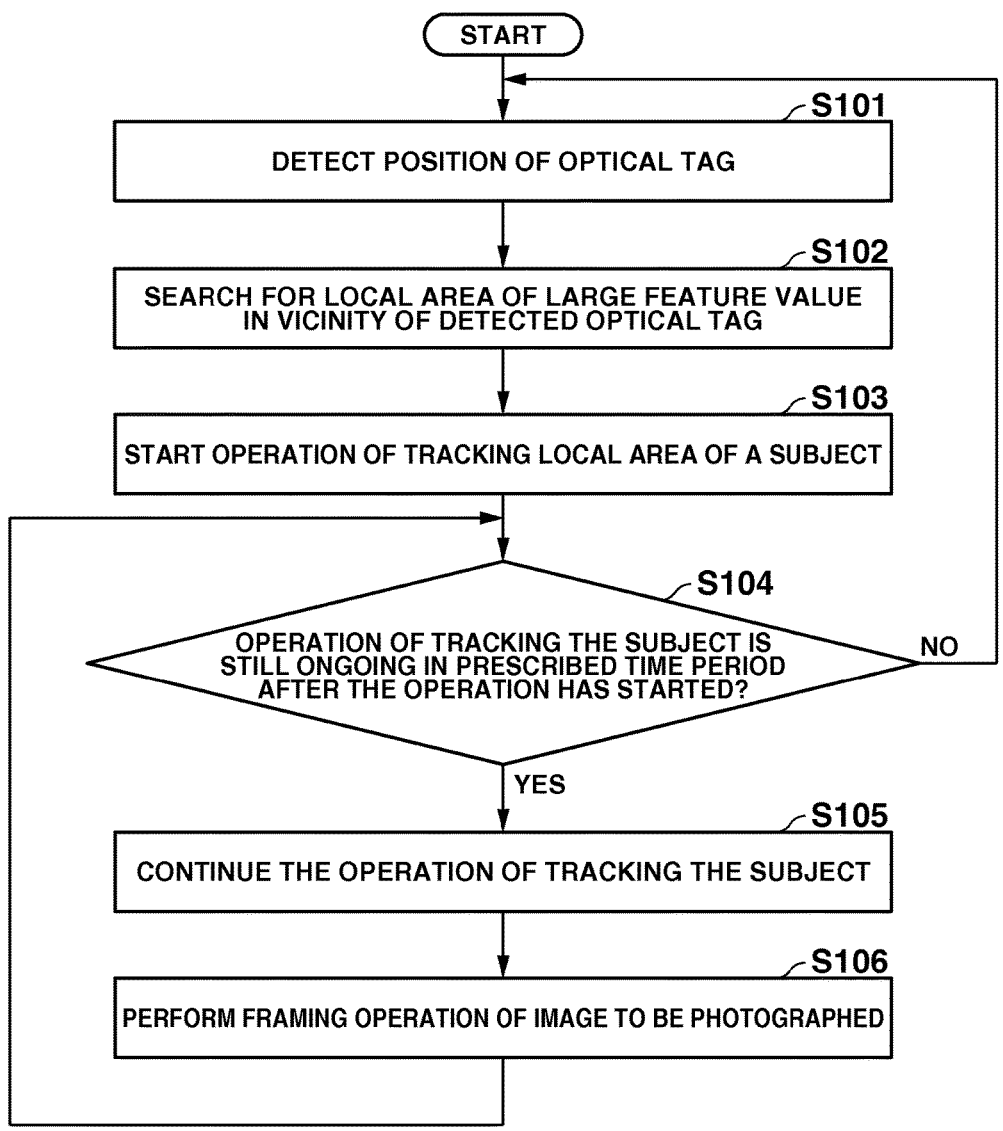
FIG. 2 is a flow chart of a process performed by an image processing unit under control of CPU in the visible light communication mode.

FIG. 2 is a flow chart showing a process performed by the image processing unit 15 under control of CPU 20 in the visible light communication mode. At the beginning, the optical-tag detecting unit 15*a* detects a position of the optical tag in time-series image data obtained up to the time based on luminance variation appearing in the image, in other words, the optical-tag detecting unit 15*a* detects the position of a portion in the image data which emits light blinking at a blinking rate of the visible light communication (step S101).

When the position of the optical tag has been detected, the local-area searching unit 15*b* of the image processing unit 15 searches for a local area in the vicinity of the detected position of the optical tag, which area is out of influence of the luminance variation (light blinking) of the optical tag and shows a large feature value (step S102).

Figure 3:
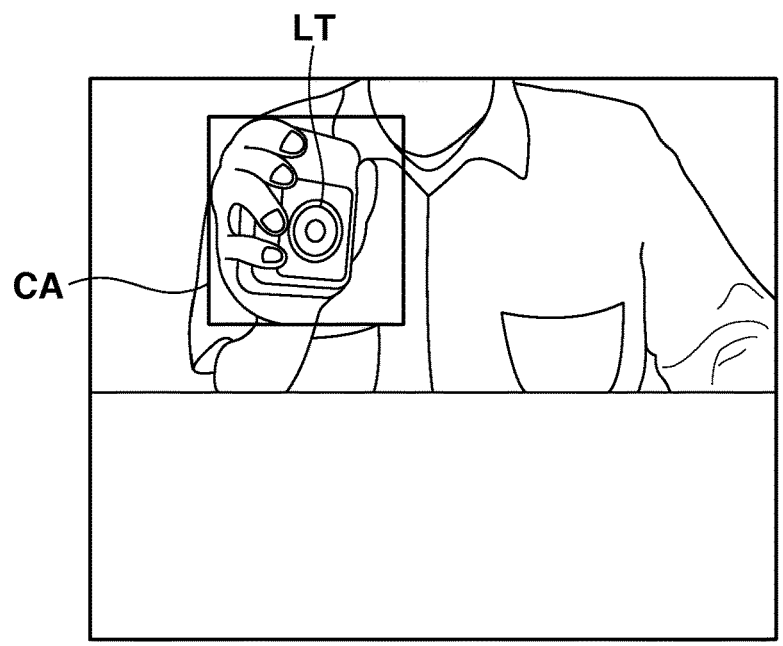

FIG. 3 is a view showing an example of a certain region CA set in the image, where the optical tag LT is included and the feature value is searched for. In FIG. 3, a region of a prescribed size in the image with the optical tag LT located approximately at its center, for instance, a square region, one forth of the longitudinal (transverse) image size (number of pixels) each side is set as a searching area CA. Within the searching area CA, a portion showing a large feature value is searched for in the image processing, more particularly, a portion where high space frequency components are concentrated is calculated and obtained.

It is possible to adjust the size of the searching area CA, for example, depending on a size of a portion where the optical tag LT blinks evenly. For instance, it is possible to select and set three sizes of searching areas CA in accordance with the number of the pixels of the optical tag LT in the longitudinal and transverse directions in the image data.

Figure 4:
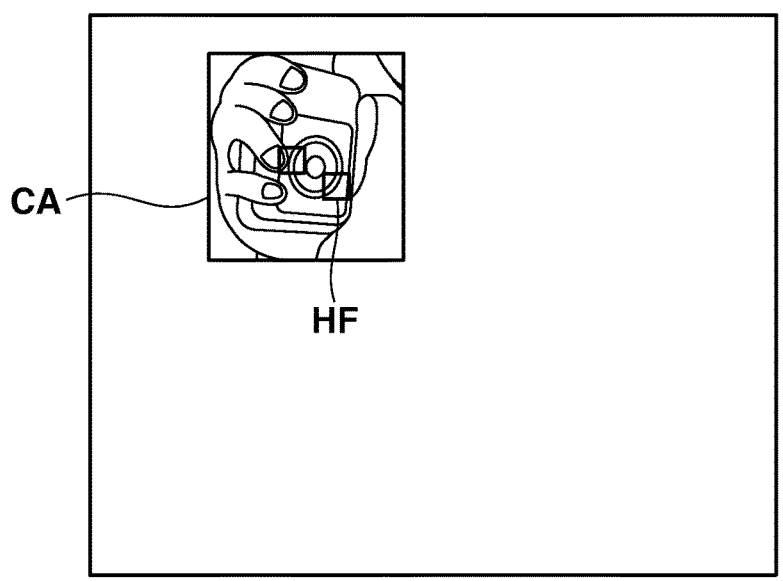
FIG. 4 is a view showing the searching area in FIG. 3, which has been subjected to two-dimension differential operation.

FIG. 4 is a view showing a result of two-dimension differential operation executed on the searching area CA shown in FIG. 3. FIG. 4 is a view showing a result of searching for a position HF where the total sum of operation values obtained by the two-dimension differential operation will be maximum. The position HF indicates an area where edge portions of an extremely high space frequency component are concentrated.

When the local area HF of a large feature value has been located, CPU 20 starts an operation of tracking the subject which includes the optical tag LT emitting light from its local area HF (step S103).

When tracking the local area HF of a large feature value, CPU 20 makes the lens driving unit 25 control rotation of a DC motor (M) 29 so as to recognize the local area HF in the image with higher accuracy, thereby adjusting the position of the focus lens of the optical lens unit of the lens unit 11 to automatically focus on the local area HF, and further makes the image sensor driving unit 27 control an electronic shutter speed of the solid-state imaging device 12 so as to keep the local area HF under an appropriate exposure, and also makes the image sensor driving unit 27 adjust F-number of the solid-state imaging device 12, if a diaphragm mechanism (not shown in FIG. 1) is mounted on the lens unit 11. Further, in the developing process by the AGC·A/D converter unit 13, CPU 20 makes a white balance adjustment to maintain a proper white balance in the above local area HF.

CPU 20 judges whether the operation of tracking the subject is still ongoing in a prescribed time period (for instance, for 1 sec,) after the operation of tracking the subject has started (step S104).

When it is determined that the operation of tracking the subject has been continuously performed more than the prescribed time period, or when it is determined that no local area HF has been detected in the image and the subject has been lost (NO at step S104), CPU 20 returns to the step S101, where CPU 20 makes the optical-tag detecting unit 15a detect the optical tag LT in the image data, again.

When it is determined that the operation of tracking the subject is still ongoing within the prescribed time period after the operation of tracking the subject has started (YES at step S104), CPU 20 makes the image processing unit 15 continue the operation of tracking the subject (step S105).

Further, CPU 20 performs a necessary framing operation depending on whether the position of the searching area CA in the image to be photographed locates in a peripheral portion of the image or not (step S106).

In the framing operation, when it is possible for the lens driving unit 25 using the DC motor (M) 29 to further move a zoom-lens position of the lens unit 11 to a more wide-angle side, CPU 20 moves the position of the zoom lens by a prescribed distance to bring the lens unit 11 to zoom-down, bringing the position of the searching area CA approximately to the center of the image to be photographed.

Although not clearly illustrated in FIG. 1, in the case that the digital camera 10 is mounted on an electric camera-platform and used as a monitor camera, it is useful to control the electric camera-platform in response to the moving subject such that the searching area CA will always keep its position approximately at the center of the image to be photographed.

After performing the framing operation at step S106, CPU 20 returns to step S104, and repeatedly performs the processes at steps S104 to step S106.

As described above, the accuracy of the operation of tracking the subject can be enhanced by tracking the local area HF of a large feature value in place of the optical tag LT, as an indicator to be tracked, without influenced by the shape of the optical tag LT and/or the luminance variation of the blinking optical tag LT.

Further, as described in detail, the embodiment of the invention makes it possible with higher accuracy to keep recognizing and tracking the subject including the optical tag LT performing the visible light communication.

In the embodiment of the invention, since a portion of the image out of influence of light blinking (luminance variation) of a light emitting element is to be searched for as the local area, the operation of tracking the subject can be performed in stable condition by excluding influence of light emission of the optical tag LT.

Although not described in the embodiment of the invention, information transmitted by means of the visible light communication is demodulated by the demodulator 15c of the image processing unit 15 when the optical tag LT has been recognized, and the demodulated information is compared with information previously set in the digital camera 10. When the both information coincide with each other, it will be possible to determine a subject installed with or having the optical tag LT as an object to be tracked and to start the operation of tracking the object. In this way, it is possible to automatically select any object without any restriction as the subject to be tracked.

In the embodiment of the invention, the searching area CA is variably set not evenly, but depending on some elements, and therefore the accuracy of the operation of tracking the subject can be enhanced depending on various setting conditions.

For instance, a size of the searching area CA is decided depending on the size of the optical tag LT, and by setting a proper size of the searching area CA at all time, the operation of tracking the subject can be performed in stable condition and with high accuracy.

In telephotography using a long focal length based on the zoom-lens position of the lens unit 11, a moving distance of a subject in an image is large when the subject moves and a depth of field is comparatively shallow, and therefore, operation of bringing the subject into focus will be severe. Meanwhile, the size of the searching area CA is large, and in wide-angle photography using a short focal length, a moving distance of the subject in the image is short when the subject moves and the depth of field is comparatively deep, and therefore, the accuracy in the operation of bringing the subject into focus is not required so much. Therefore, the stable accuracy in tracking the subject will be enhanced by setting the size of the searching area CA small.

Further in the embodiment of the invention, when the local area HF is searched for among the searching area CA, the two-dimension differential operation is executed on the searching area CA, suppressing a calculation load, thereby reducing a processing load of the image processing unit 15 and enhancing the response of the operation of tracking the subject. As a result, it will be easy to search for a part where the space high frequency components concentrate.

In the present invention, not only the two-dimension differential operation but also two-dimension FFT (Fast Fourier Transform) can be employed to search for the minimum area of a large feature value in a similar manner.

In general, a person who is to be tracked often wears the optical tag LT on the position of his/her chest pocket and, although depending on the focal length of the lens unit 11, there is a high possibility that the person's face to be photographed is brought to the vicinity of the optical tag LT.

In addition, a facial recognition technique has been put to practical use to such a level that a person is identified and registered, and the average digital cameras employ such a function as focusing on a face(s) of a person(s) to be photographed. Therefore, digital cameras can be provided as a practical commodity, which cameras detect the optical tag LT and then recognize and set a face of a person nearest the optical tag LT as the local area HF, thereby making an automatic exposure control, automatic focusing, and automatic white balance adjustment on the local area HF.

In the embodiment of the invention, since the optical tag LT blinking in the visible light communication is employed as to detect luminance variation, the optical tag LT can be applied in the visible light communication using mono-color LEDs, which are expected wide spread at present.

In the visible light communication using multi-color LEDs, transmitting information by chromaticity variation, for instance, since the optical tag LT can be applied in a similar manner by detecting variation of chromaticity elements of the primary colors RGB, and further, by combining the chromaticity variation and the luminance variation, information volume which can be transmitted will increase.

Concerning the detection of the optical tag LT and the setting of the searching area CA in the image to be photographed, appropriate combination of the touch operation on the touch input unit 24 and the user's pinch-out operation using two fingers will improve user-friendliness of the apparatus, allowing a smooth operation of tracking the subject.

In the above description, the digital camera to which the present invention is applied, has been described, wherein the camera has the function of tracking the optical tag in the image to be photographed, but the present invention will be applied to watch cameras, application programs of the smartphones, and other various usages.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. An imaging apparatus comprising:
   an imaging sensor which images a subject to obtain image data; and
   a processor which executes a program stored in a program memory to perform operations including:
   an optical tag detecting operation which detects a position of a light-emitting optical tag in the image data obtained by the imaging sensor, by detecting a position of a portion included in the image data where light changes in a time-series manner;
   a region defining operation which defines a searching region which includes the optical tag and is larger than the optical tag;
   a local area searching operation which searches, within the defined searching region, for a local area that (i) is within the defined searching region and is smaller than the defined searching region, (ii) does not include the optical tag and is not influenced by the light that changes in the time-series manner, and (iii) is an area within the defined searching region where high spatial frequency components are concentrated; and
   a tracking operation which tracks movement of the local area found by the local area searching operation.

2. The imaging apparatus according to claim 1, the operations further comprising:
   an information obtaining operation which obtains optically modulated information from the optical tag detected by the optical tag detecting operation;
   a demodulator operation which demodulates the optically modulated information obtained by the information obtaining operation; and
   a judging operation which judges whether or not the information demodulated by the demodulator operation is equivalent to previously set information,
   wherein the tracking operation tracks the movement of the local area found by the local area searching operation, when the judging operation determines that the information obtained by the demodulator operation is equivalent to the previously set information.

3. The imaging apparatus according to claim 1, wherein the region defining operation variably sets the searching region within which the local area searching operation searches for the local area.

4. The imaging apparatus according to claim 3, wherein the region defining operation variably sets the searching region for searching for the local area, based on a size of the portion included in the image data where the light changes in the time-series manner.

5. The imaging apparatus according to claim 3, further comprising:
   a zoom lens of a variable focal length,
   wherein the region defining operation variably sets the searching region for searching for the local area, based on the focal length of the zoom lens, when the imaging sensor images the subject.

6. The imaging apparatus according to claim 1, wherein the local area searching operation executes a two-dimension differential operation on the image data in a vicinity of the position of the optical tag detected by the optical tag detecting operation, and finds a maximum total value of operation values in the vicinity of the position from the image data subjected to the two-dimension differential operation, thereby searching for the local area.

7. The imaging apparatus according to claim 1, the operations further comprising:

a face searching operation which searches for a face of the subject within a prescribed region defined based on the position of the optical tag detected by the optical tag detecting operation; and an imaging-operation controlling operation which makes the imaging sensor perform at least one of automatic exposure control, automatic focus control, and automatic white balance adjustment, depending on a position of the face of the subject found by the face searching operation.

8. The imaging apparatus according to claim 1, wherein the optical tag emits light that varies in luminance, and the portion included in the image data where the light changes in the time-series manner is a portion which varies in luminance.

9. The imaging apparatus according to claim 1, wherein the optical tag emits light that varies in chromaticity, and the portion included in the image data where the light changes in the time-series manner is a portion which varies in chromaticity.

10. A method of tracking a subject in an imaging apparatus provided with an imaging sensor for imaging the subject to obtain image data, the method comprising:

detecting a position of a light-emitting optical tag in the image data obtained by the imaging sensor, by detecting a position of a portion included in the image data where light changes in a time-series manner;

defining a searching region which includes the optical tag and is larger than the optical tag;

searching, within the defined searching region, for a local area that (i) is within the defined searching region and is smaller than the defined searching region, (ii) does not include the optical tag and is not influenced by the light that changes in the time-series manner, and (iii) is an area within the defined searching region where high spatial frequency components are concentrated; and tracking movement of the local area.

11. A non-transitory computer-readable recording medium with an executable program stored thereon, the program being executable by a computer of an imaging apparatus having an imaging sensor for imaging a subject to obtain image data, to control the computer to perform operations including:

an optical tag detecting operation which detects a position of a light-emitting optical tag in the image data obtained by the imaging sensor, by detecting a position of a portion included in the image data where light changes in a time-series manner;

a region defining operation which defines a searching region which includes the optical tag and is larger than the optical tag;

a local area searching operation which searches, within the defined searching region, for a local area that (i) is within the defined searching region and is smaller than the defined searching region, (ii) does not include the optical tag and is not influenced by the light that changes in the time-series manner, and (iii) is an area within the defined searching region where high spatial frequency components are concentrated; and a tracking operation which tracks movement of the local area found by the local area searching operation.

12. The imaging apparatus according to claim 1, wherein the local area searching operation searches for, as the local area, an area within the defined searching region where edge portions having high spatial frequency components are concentrated.

* * * * *